United States Patent [19]

Jacobs et al.

[11] Patent Number: 4,894,131

[45] Date of Patent: Jan. 16, 1990

[54] APPARATUS FOR THE SURFACE TREATMENT OF SYNTHETIC FIBERS OR YARNS

[75] Inventors: Martinez J. Jacobs, Geleen; Hendrickus J. J. Rutten, Maastricht, both of Netherlands

[73] Assignee: Dyneema V.O.F., Sittard, Netherlands

[21] Appl. No.: 251,456

[22] Filed: Sep. 30, 1988

[30] Foreign Application Priority Data

Oct. 2, 1987 [DE] Fed. Rep. of Germany ....... 3733443

[51] Int. Cl.⁴ .............................................. C07C 17/00
[52] U.S. Cl. ................................. 204/165; 422/186.05
[58] Field of Search ....................... 204/165, 168, 169; 422/186.05

[56] References Cited

U.S. PATENT DOCUMENTS 2,810,933 10/1957 Pierce .................................. 204/169
3,281,347 10/1966 Winder ................................ 204/165
4,419,869 12/1983 Sando .................................. 204/165

FOREIGN PATENT DOCUMENTS 204907 1/1979 Fed. Rep. of Germany .

OTHER PUBLICATIONS

Abstract—JP-A-57101073.

Primary Examiner—T. M. Tufariello
Attorney, Agent, or Firm—Cushman, Darby & Cushman

[57] ABSTRACT

An apparatus for the surface treatment of synthetic fibers or yarns, in particular of fibers and yarns of polyethylene of ultra-high molecular weight, for improvement of the adhesion, a corona is generated by means of two active electrodes (10, 12), between which the fibers or yarns are passed parallel to the longitudinal extent. The electrodes are designed with a surrounding insulating sheath. The current fed to the electrode (16) is phase-shifted by $\phi = 180°$ with respect to the current fed to the electrode (10).

10 Claims, 1 Drawing Sheet

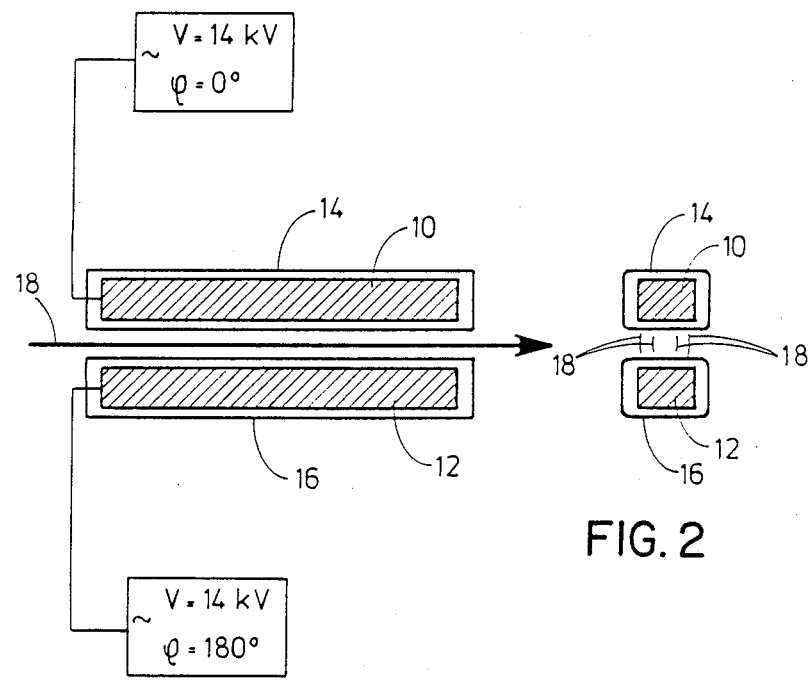

APPARATUS FOR THE SURFACE TREATMENT OF SYNTHETIC FIBERS OR YARNS

The invention relates to an apparatus for the surface treatment of synthetic fibers or yarns for improvement of the adhesion, by means of a corona.

It is known to treat synthetic fibers or synthetic yarn on the surface by means of corona, in order that an improvement in the surface properties, for example in the adhesion is achieved. In this case, an active electrode is arranged opposite a passive or grounded electrode. The filaments or yarns are fed transversely to the corona, so that a very short treatment zone is produced between the electrodes. It is disadvantageous in the case of this known apparatus that point discharges are possible between the electrodes, which does not allow uniform treatment of the fibers or yarns. Furthermore, the fibers are often damaged during their passage through the corona and the tensile strength of the fibers or filaments treated with such an apparatus is up to 30% lower.

The invention is based on the object of creating an apparatus with which the surfaces of synthetic fibers, in particular of polyethylene fibers of ultra-high molecular weight, can be treated, for example for improvement of the adhesive properties, without the mechanical properties of the fibers or yarns being adversely affected.

This object is achieved according to the invention by two elongate linear, insulated, active electrodes, between which the fibers or yarns are passed.

The apparatus according to the invention is of very simple design and is characterized in that point discharges between the electrodes are prevented. During passage of the fibers or yarns through the electrodes, their tensile strength is not impaired, so that the quality of the fibers or yarns is greatly improved altogether by the treatment.

According to a preferred embodiment, the current fed to the electrodes is phase-shifted by $\phi = 180°$. The voltage at both electrodes is preferably 14 kV. The arrangement of two active electrodes which are insulated but fed with phase-shifted current has the effect of achieving a uniform treatment of the fibers or yarns passed through and of avoiding any dielectric breakdowns between the electrodes.

The electrodes are arranged parallel to the feed direction of the fibers or yarns. The rate of passage of the yarns or fibers through the electrodes is preferably between 25 and 1000 m/min and in particular 200 m/min for each meter length of the electrodes. The shorter the electrodes, the lower the rate of passage and vice versa, so that an approximately constant treatment time is produced. The arrangement of the electrodes parallel to the feed direction has the effect that a surface treatment is achieved by a once-only passage of the yarns or fibers through the zone between the electrodes. At the same time, a plurality of yarns or fibers in parallel with one another may be passed through between the electrodes.

According to a further preferred embodiment, the feed direction of a cloth is perpendicular to the longitudinal extent of the electrodes.

The total treatment time of the fibers, yarns or of a cloth during passage through the electrodes is 0.05 to 2.5 seconds, preferably 0.3 seconds, both in the case of longitudinally passed yarns or fibers and transversely passed cloths.

According to a preferred embodiment, the electrodes have a width of approximately 3 to 10 mm, a surrounding insulating sheath having a thickness of approximately 2 mm, a length exceeding 200 mm, and a spacing between the surfaces of the insulating sheaths of approximately 2 to 5 mm. Electrodes having a length of 340 mm, with insulating sheath added to that in each case at the end faces, provide good results.

The insulating sheath of the electrodes preferably consists of quartz or ceramic. The voltage fed to the electrodes is maximally about 14 kV at 20 to 25 kHz. An energy supply of approximately 400–1000 W/m electrode is preferred.

An exemplary embodiment of the invention is explained in more detail below with reference to the drawing. The FIGURE shows:

An embodiment of a corona for treatment of the surface of synthetic fibers, in particular of polyethylene of ultra-high molecular weight, the filaments or fibers being fed in longitudinal direction of the electrodes.

The FIGURE shows a corona comprising an electrode 10 and an electrode 12 opposite the former electrode. The two electrodes 10 and 12 are active electrodes, which are supplied with a voltage of 14 kV in each case. The current fed to the electrode 12 is phase-shifted by $\phi = 180°$ with respect to the current fed to the electrode 10. The electrodes 10 and 12 are surrounded by an insulating sheath 14 and 16, respectively, which may consist of quartz or ceramic and is approximately 2 mm thick at every point. The electrodes are spaced approximately 5 mm apart, the spacing being measured between the surfaces of the insulating sleeves 44 and 16. Yarns or fibers 18 of a synthetic material, in particular of polyethylene of ultrahigh molecular weight, are passed through between the electrodes 10 and 12. The rate at which the yarns or fibers 18 are passed through is 25 to 1000 m/min, in particular 200 m/min per meter length of the electrodes. A plurality of yarns or fibers parallel to one another may be passed through the electrodes 10, 12. The current feeding the electrodes has a frequency of 20 to 25 kHz and a voltage of approximately 14 kV. The energy consumption is approximately 1000 W/m electrode. A fabric is passed between the electrodes 10 and 12 transversely to their longitudinal extent.

The effectiveness with which the surface treatment takes place is a function of the rate of treatment. It has been found that, in the case of yarns fed parallel to longitudinally extended electrodes, rates of 200 m/min per meter length of the electrodes provide very good results. In the case of cloths fed transversely to the electrodes, rates which produce a treatment time of approximately 0.3 sec, provide very good results.

It is expedient to carry out directly after the corona treatment a chemical treatment to increase the wetting and adhesion properties of the corona-treated articles, by which additional active groups are brought to the surface of the articles, for example carboxyl groups, hydroxyl groups or carbonyl groups. Such a treatment may be carried out, for example, with unsaturated compounds, such as acrylic acid, acrylamide, maleic acid, glycidyl methacrylate, hydroxyethyl methacrylate, itaconic acid, vinyl acetate etc. Preferably, a polymerization inhibitor is used thereby, such as an iron (III) compound, in order to avoid a polymerization of the unsaturated compounds. For example, such a chemical treatment may take place by introduction of the corona-treated articles into a solution of the said unsaturated compounds, such as for example in an acrylic acid solution, it being also possible however to carry out a chemical after-treatment in the gas phase. Such chemical processes for increasing the adhesion properties of polyolefin are known.

EXAMPLES

Tests with the apparatus according to the invention have shown that, with a corona of 320 mm effective length and an energy consumption of 150 W, a yarn rate of 20 m/min and an electrode spacing of 5 mm with yarn fed parallel to the longitudinal extent, the yarn has a tensile strength of 73.4±1.2N. In the case of a corona apparatus with two active insulated elongate electrodes of 250 W, to which yarn is fed at a rate of 50 m/min, the electrodes having a spacing of 5 mm, yarn tensile strengths of 69.4±5.3N were achieved. Untreated yarn has a tensile strength of about 72N.

The shear strength of a composite of an untreated PE yarn in a matrix was 13.5±1.2 MPa. The following table shows the shear strengths for yarns treated with the apparatus according to the invention, in a matrix.

| Power of the corona (Watt) | Rate of passage (m/min) | Shear strength (MPa) |
| --- | --- | --- |
| a) 150 | 20 | 20.5 ± 0.8 |
| b) 250 | 50 | 20.1 ± 0.8 |
| c) 100 | 30 | 19.0 ± 1.6 |
| d) 100 | 75 | 18.0 ± 1.5 |
| e) 100 | 150 | 15.5 ± 1.4 |
| f) 100 | 300 | 14.8 ± 0.6 |
| g) 300 | 15 | 21.0 ± 1.4 |
| h) 300 | 30 | 20.5 ± 0.7 |
| i) 300 | 75 | 19.8 ± 1.1 |
| j) 300 | 150 | 18.5 ± 1.0 |
| k) 300 | 300 | 16.2 ± 0.7 |

In all examples the tensile strength decreased not more than 10%.

We claim:

1. An apparatus for the surface treatment of synthetic fibers or yarns, useful for treating polyethylene fibers of ultra-high molecular weight for improvement of the adhesion by means of a corona comprising two elongate linear, insulated, active electrodes, between which the fibers or yarns are passed.

2. An apparatus as claimed in claim 1, wherein the currents fed to the electrodes are phase-shifted by $\phi = 180°$.

3. An apparatus as claimed in claim 1, wherein the electrodes (10, 12) are arranged parallel to the feed direction of the fibers or yarns (18).

4. An apparatus as claimed in claim 1 wherein the rate of passage of the yarns or fibers through the electrodes is between 25 and 1000 m/min for each meter length of the electrodes.

5. An apparatus as claimed in claim 1, wherein the feed direction of a cloth is perpendicular to the longitudinal extent of the electrodes (10, 12).

6. An apparatus as claimed in claim 1, wherein the electrodes (10, 12) have a width of approximaterly 3 to 10 mm, an insulating sheath having a thickness of approximately 2 mm, a length exceeding 200 mm and a spacing between the surfaces of the insulating sleeves of approximately 2 to 5 mm.

7. An apparatus as claimed in claim 1, wherein the insulating sheath (14, 16) consists of quartz or ceramic.

8. An apparatus as claimed in claim 1, wherein the voltage fed to the electrodes has approximately 14 kV and 20 to 25 kHz.

9. A process for the surface treatment of synthetic fibers or yarns or ultra-high molecular weight polyethylene whereby the adhesion of said fibers or yarns is improved by means of a corona which comprises two elongate linear, insulated, active electrodes between which the fibers or yarns are passed.

10. The apparatus of claim 4 wherein the rate of passage of the yarns or fibers through the electrodes is between 50 and 300 m/min.

* * * * *

UNITED STATES PATENT AND TRADEMARK OFFICE
CERTIFICATE OF CORRECTION

PATENT NO. : 4,894,131
DATED : January 16, 1990
INVENTOR(S) : Martinez J. Jacobs, et al.

It is certified that error appears in the above-identified patent and that said Letters Patent is hereby corrected as shown below:

Column 4, claim 6, line 21, change "approximaterly" to --approximately--.

Column 4, claim 9, line 32, after "yarns" insert --of--; delete "or" (second occurence).

Signed and Sealed this

Thirty-first Day of March, 1992

Attest:

HARRY F. MANBECK, JR.

*Attesting Officer*   *Commissioner of Patents and Trademarks*